Patented Apr. 13, 1943

2,316,606

UNITED STATES PATENT OFFICE 2,316,606

POLYCARBOXYLIC ACIDS

Donald J. Loder and William F. Gresham, Wilmington, Del., assignors to E. I. du Pont de Nemours & Company, Wilmington, Del., a corporation of Delaware No Drawing. Application July 13, 1940,
Serial No. 345,420

1 Claim. (Cl. 260—534)

This invention relates to a process for the preparation of polycarboxylic acids and more specifically to the preparation of amino polycarboxylic acids and their salts from the amino acetals.

The compounds are obtained by the interaction of one mole of an amino acetal, in an alkaline solution with from 4 to 5 moles of a mono halogenated carboxylic acid (or the amino acetal with an alkali metal salt of the acid) at temperatures between 20 and 100° C. and under normal pressures, although pressures above or below atmospheric may be used if desired. The amino polycarboxylic acids are thus obtained as salts in solution; if it is desired, the free acid can be liberated by acidification of the solution of the salt.

Examples of amino acetals which may be reacted in accord with the process of this invention are ethanol amine formal, $$CH_2(OCH_2CH_2NH_2)_2$$

propanol amine formal, $CH_2(O(CH_2)_3NH_2)_2$; and the higher straight and branched chain symmetrical formals as well as the unsymmetrical formals such as ethanol propanol amine formal,

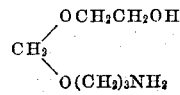

methanol amine, ethanol amine formal,

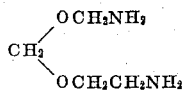

ethanol amine propanol amine formal,

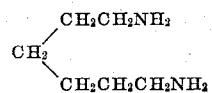

and the like. The process is applicable not only to the preparation of polycarboxylic acids and their metal salts from these formals but likewise to their preparation from the similar higher acetals such as the acetals, propanals, and higher similar derivatives such as are designated by the empirical formula:

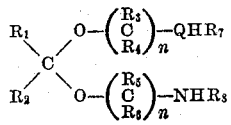

in which the R groups designate hydrogen and/or hydrocarbon groups; $n$ is an integer, Q is oxygen or nitrogen, and when Q is oxygen $QHR_7$ becomes OH.

These acetals may be reacted with the halogenated carboxylic acids generally, but more particularly the mono α halogenated fatty acids such as mono chloracetic acid, mono α chlorpropionic acid, mono α chlorbutyric acid, and the like.

By this process amino polycarboxylic acids having the following empirical formula are obtained:

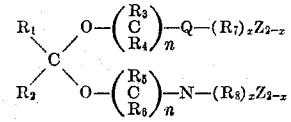

in which the R groups are hydrogen and/or hydrocarbon groups; $n$ is an integer, $x$ is 0 or 1, Z is the radical

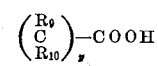

(in which $R_9$ and $R_{10}$ are hydrogen and/or hydrocarbon groups, and $y$ is an integer), Q is oxygen or nitrogen, and when Q is oxygen $(R_7)_x$ drops out and $Z_{2-x}$ becomes Z. Thus from ethanol amine formal is produced $$CH_2[OCH_2CH_2N(CH_2COOH)_2]_2$$

from propanol amine formal, $$CH_2[O(CH_2)_3N[CH_2COOH]_2]_2$$

and from ethanol, ethanol amine formal,

The following example will further illustrate the invention without limiting it to the details shown. The parts given are by weight.

*Example 1.*—Sodium ethanol amine formal N,N,N¹,N¹-tetracetate:

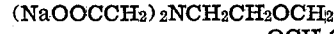
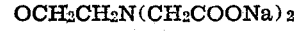

To a solution of 47.2 parts of chloracetic acid in 40 parts of water is added with cooling and stirring 20 parts of sodium hydroxide in 50 parts of water at such a rate that the temperature of the mixture remains below 15° C. To this solution containing 58 parts of sodium chloracetate is added 16.7 parts of ethanol amine formal and 31 parts of monohydrated sodium carbonate. This reaction mixture is let stand at 20–35° for 4 hours and is then heated to 85 to 95° for 4 hours. After cooling the mixture, a small amount of sodium bicarbonate is removed by filtration. The clear filtrate contains sodium ethanol amine formal NNN'N'-tetracetate which can be used directly as a water-treating agent for the purposes described below and when so used, and especially when used as a lime sequestering agent and water softener, it should be employed in sufficient amounts to prevent undesirable precipitation.

The polycarboxylic acids and especially their water-soluble salts, such as their salts with basic reacting organic compounds, with ammonia, substituted ammonia, and alkali metals give products which are useful as detergents, detergent assistants, hard-water softening agents, lime sequestering agents, dye assistants, and water-treating agents generally for use in deterging, flocculating, deflocculating, foaming, dyeing, and wetting. They are further useful in the wetting out of gray goods, as assistants in peroxide bleaching, as lime dispersing agents, for scouring rayon yarns and fabrics, for wetting out of cotton goods that are to be pre-shrunk, scouring of lime-pulled wool, degumming, preparation of raw stock for dyeing, as a dispersing and penetrating agent in dyeing, penetrating agent in warp sizing, in alkaline fulling, and generally in processes where detergents, detergent assistants, and water-treating agents are used with advantage.

We claim:

A process for preparing sodium ethanol amine formal N-tetracetate having the empirical formula $$CH_2[OCH_2CH_2N(CH_2COONa)_2]_2$$

which consists in admixing with stirring and cooling below 15° C. a solution of 47.2 parts by weight chloracetic acid in 40 parts by weight water and a solution of 20 parts by weight sodium hydroxide in 50 parts by weight water, then incorporating 16.7 parts by weight ethanol amine formal and 31 parts by weight sodium carbonate monohydrate; allowing the reaction mixture to stand at 20 to 35° for four hours, then heating the reaction mixture to 85 to 95° for an additional four hours, cooling and filtering off precipitated sodium bicarbonate, and separating a filtrate containing sodium ethanol amine formal N-tetracetate.

DONALD J. LODER.
WILLIAM F. GRESHAM.